United States Patent [19]

Cerny, Jr.

[11] Patent Number: 4,644,736

[45] Date of Patent: Feb. 24, 1987

[54] COTTON DOFFER UNIT

[75] Inventor: John Cerny, Jr., Bettendorf, Iowa

[73] Assignee: Deere & Company, Moline, Ill.

[21] Appl. No.: 882,014

[22] Filed: Jul. 3, 1986

Related U.S. Application Data

[63] Continuation of Ser. No. 595,334, Mar. 30, 1984, abandoned.

[51] Int. Cl.⁴ ............................................. A01D 46/16
[52] U.S. Cl. ........................................... 56/41; 56/50
[58] Field of Search ................. 56/40, 41, 42, 43, 44, 56/45, 46, 47, 48, 49, 50; 525/452

[56] References Cited

U.S. PATENT DOCUMENTS

| | | |
|---|---|---|
| 2,693,071 | 11/1954 | Parkerton ............................ 56/41 |
| 2,738,636 | 3/1956 | Walker ................................ 56/41 |
| 2,847,815 | 8/1958 | Radow et al. ....................... 56/41 |
| 3,333,406 | 8/1967 | Parkerton ............................ 56/41 |
| 3,971,197 | 7/1976 | Batzer et al. ........................ 56/41 |
| 4,335,231 | 6/1982 | Singh ................................ 525/452 |

Primary Examiner—Gene Mancene
Assistant Examiner—David I. Tarnoff
Attorney, Agent, or Firm—Burns, Doane, Swecker & Mathis

[57] ABSTRACT

A doffer unit for cotton picking machines is provided comprising a central hub portion, a ring or flange portion concentric thereto and a plurality of radially extending lugs carried by the ring and wherein such lugs are advantageously constructed from millable polyurethane elastomers.

10 Claims, 4 Drawing Figures

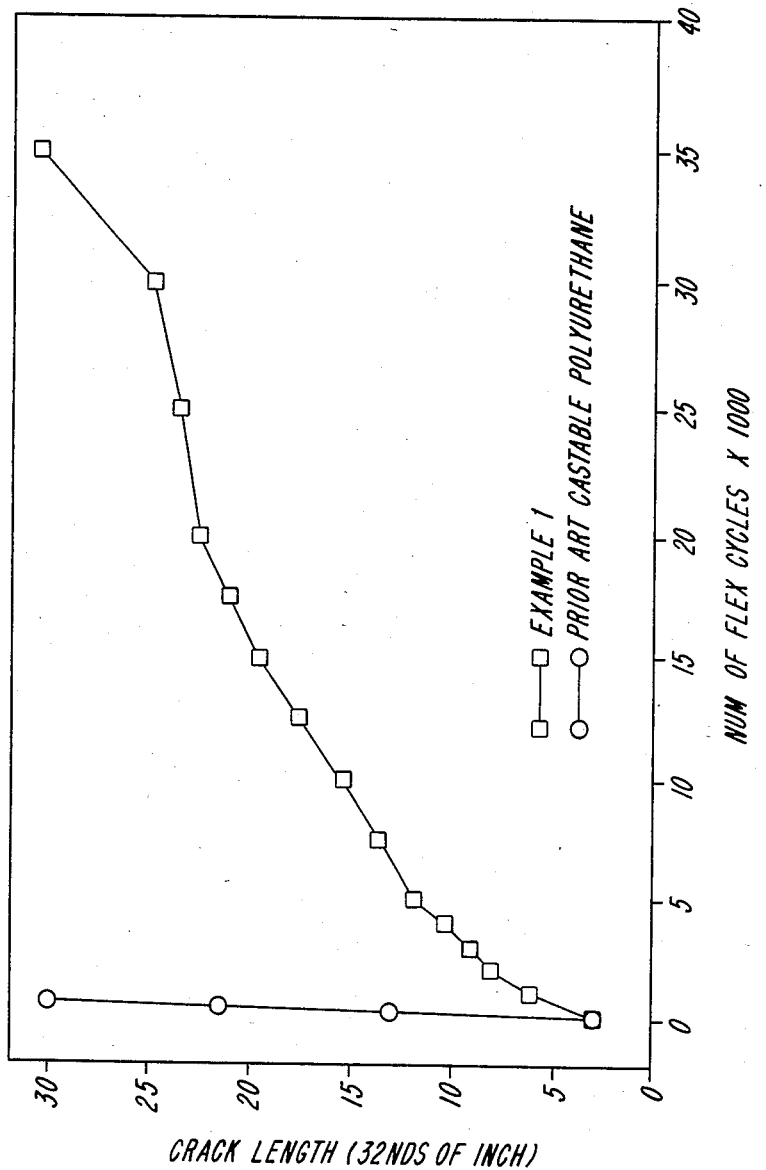

COTTON DOFFER UNIT

This application is a continuation of application Ser. No. 595,334, filed Mar. 30, 1984, now abandoned.

BACKGROUND OF THE INVENTION

The present invention relates generally to mechanical cotton pickers. More particularly, the present invention relates to rotary doffer assemblies of improved advantageous construction for removal of cotton from rotating picking spindles in conventional machines for cotton picking.

Typical cotton picker units include rotating heads disposed on a vertical axis and carrying a series of radially extending rotating spindles which pick exposed cotton from open cotton bolls as a consequence of the rotation of the spindles on their own axes and by reason of slight barbing or roughening of the spindle surfaces. In turn, the cotton-bearing spindles pass rotating doffer discs having radially extending and vertically projected annular teeth or lugs which function to wipe or doff the gathered cotton from the spindles as the doffers and spindles rotate in cooperating relationship. The operation of conventional picking units and the arrangement of doffers and spindles are described and depicted in Deere and Company publication No. A-29-84-1 "Cotton Pickers and Strippers" which is incorporated herein by reference.

In operation, the picker spindles of cotton machines not only are subjected to varying accumulations of cotton thereon depending upon increases or decreases in the harvested yield per acre, relative moisture content of the bolls, variations in speed at which the field is traversed, and the like, but likewise, encounter varying accumulations of associated matter such as rocks, dirt, plant stock, weeds, etc. Accordingly, the lugs or teeth of the doffer assemblies as well as the associated hub and disc to which the doffer lugs are attached are subjected to varying load stresses, shock forces and elevated temperatures during normal operation which tend to cause splitting and breakage of the doffer elements or otherwise sufficient wear and deterioration to require the expensive replacement of individual doffer elements and, depending upon the degree of difficulty encountered in picker-doffer alignment, may necessitate the replacement of the entire doffer assembly.

Heretofore, various doffer designs have been suggested to provide doffers which are sufficiently flexible to accomodate the abrasion, shock, and friction load forces and temperatures to which the doffer assemblies are subjected while at the same time attempting to maintain sufficient structural rigidity to promote adequate wear life for such doffer assemblies. For example, doffer elements, including the annular lugs thereon, made of an elastomeric material such as sponge rubber are disclosed in U.S. Pat. No. 2,738,636. U.S. Pat. No. 2,693,071 discloses doffer discs in which the disc body is derived from thermosetting or thermoplastic materials and the doffing fingers or lugs are produced from tire tread stock. It has been found through field experience that such doffer elements derived from elastomeric rubbers, while providing the desired resiliency, do not maintain sufficient durability levels and are further disadvantageous from the standpoint that such normally black materials when subjected to the load stresses and temperatures encountered during operation tend to result in black specks in the raw cotton which often objectionably appear in the final cotton fabrics.

Another approach is that of U.S. Pat. No. 2,847,815 describing doffer lugs or pads which are integrally connected to a center disc made of rubber or synthetic rubber material having a Durometer hardness of 60 and in which the disc is strengthened by the inclusion of fabric rings, e.g., cotton, artificial fibers such as nylon, rayon or dacron bonded to both sides of the disc.

More recently, U.S. Pat. No. 3,971,197 describes doffer elements comprising an integrally molded doffer with a disc shaped reinforcement, preferably perforated, embedded in the doffer along a rim or annular portion of the disc. The doffer body is of molded elastomeric material such as natural or synthetic rubbers and blends thereof or may be derived from liquid cast materials such as polyurethane. The polyurethane material is described only as being capable of liquid casting or molding and having a Durometer range of 70–90 on the shore A hardness scale. The doffer assembly described may also be constructed with layers of polyurethane so that the first layer may comprise 10 to 30% of the doffer thickness and have a Durometer of 55–75 on the shore D hardness scale while a second layer is 70 to 90% of the thickness having a hardness range of 65 to 95 on the shore A hardness scale. The foregoing doffer allows for both circumferential and axial deflection.

However, it has been found in practice that the doffers derived from such castable polyurethanes, while achieving a degree of flexibility are, nevertheless, subject to deterioration through breakage of the doffer lugs or large portions thereof when subjected to shock and striking forces such as those resulting from the doffer elements being struck by accumulated debris between the spindles and the doffer elements or by striking of the lugs by the rotating spindles if minor misalignments should occur.

SUMMARY OF THE INVENTION

It is, therefore, a primary object of the present invention to provide doffer elements, and particularly, doffer lugs or teeth which do not suffer from the disadvantages experienced with heretofore proposed doffers.

Another object of the present invention is to provide improved disc units for doffer assemblies which are abrasion, shock, and temperature resistant while at the same time being flexible, structurally stable and long wearing.

In accordance with the foregoing, a doffer unit for cotton picking machines is provided comprising a central hub portion, a ring or flange portion concentric thereto and a plurality of radially extending lugs carried by the ring and wherein such lugs are advantageously constructed from millable polyurethane elastomers.

THE DRAWINGS

These and other objects features and advantages of the present invention will be apparent to those skilled in the art upon reference to the following specification and the accompanying drawings wherein:

FIG. 4 is a graph showing the results of comparative flex testing.

DETAILED DESCRIPTION OF THE INVENTION

Figure 1:
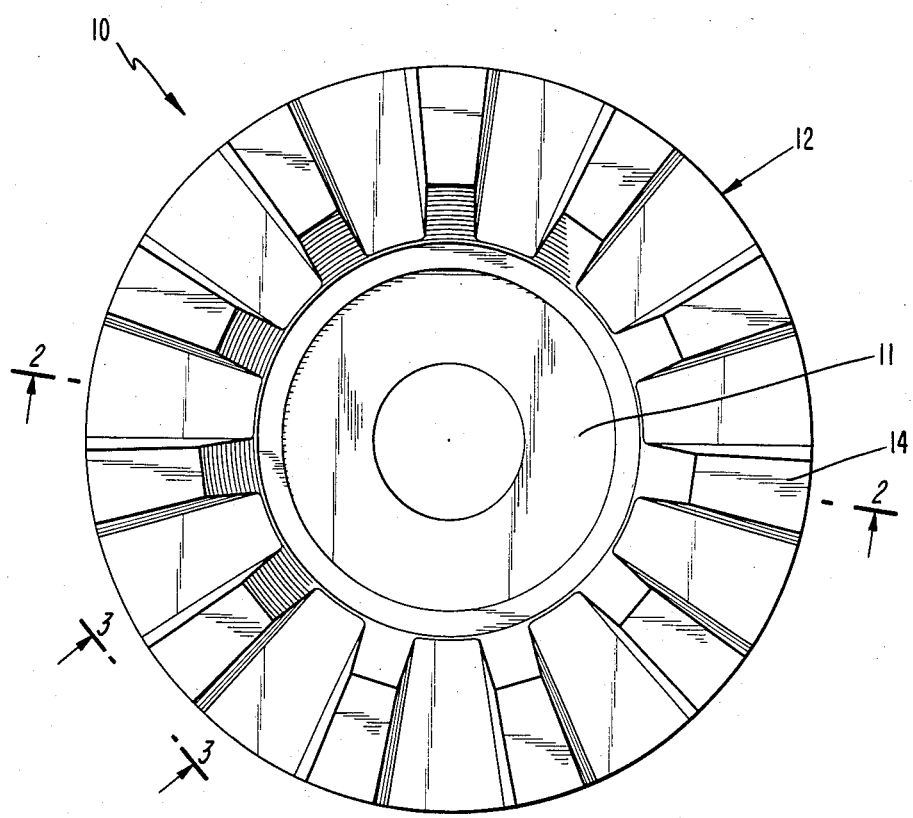
FIG. 1 is a plan-view depicting the lug side of a doffer of the invention.
Figure 2:
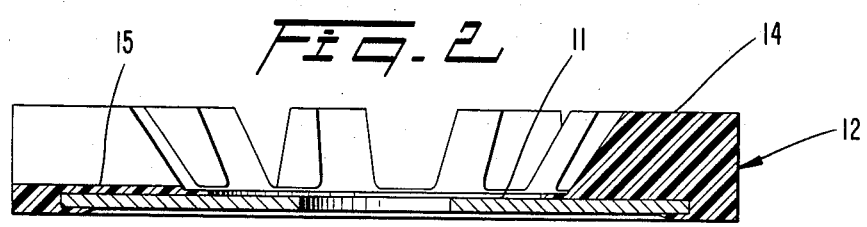
FIG. 2 is a cross-sectional view taken along line 2—2 of FIG. 1.
Figure 3:
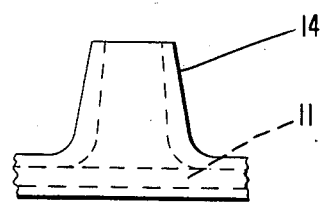
FIG. 3 is an edge view taken in the direction of line 3—3 in FIG. 1.

Consistent with the objects, features and advantages of the present invention, a disc-shaped doffer 10 for cotton is provided. More specifically, the doffer 10 includes a hub portion in the form of a plate 11 which may be comprised of metal or other suitable rigid or semi-rigid material derived from, for example, a thermosetting or thermoplastic material, including phenol-formaldehyde condensation products, polyvinylchloride, resin or fiber reinforced rubber elastomers, polycarbonate resin, etc. The hub plate 11 may, optionally, be further provided with a keyway (not shown) to register with corresponding keyways in the doffer carrier or driveshaft (not shown). Concentric with the hub plate 11 is an annular flange or ring 12 which may be of integral one-piece construction or may comprise a separately formed piece which is fastened or molded thereon. The ring includes a plurality of circumferentially spaced doffer lugs 14 which extend radially and are raised relative to a surface 15 of the ring.

The doffer lugs of improved construction in accordance with the present invention are comprised of millable polyurethane elastomers which have now been surprisingly found to be superior in physical-mechanical properties compared to materials heretofore employed in the construction of doffers, including previously proposed liquid cast polyurethanes.

Accordingly, an important feature of the present invention is in the provision of cotton doffer lugs derived from certain polyurethanes broadly classified as millable polyurethane elastomers. As the result of extensive comparative testing of various polyurethane elastomer formulations and variations in the components thereof, including reinforcing and pigmenting fillers and curing agents as well as the rate and temperature of curing or vulcanization conditions, the applicant herein has accomplished the provision of a polyurethane material having the requisite properties for particular application in the construction of superior long wearing cotton doffers.

The preferred polyurethane elastomers for use in the improved doffers of the present invention comprise millable polyurethanes to which conventional techniques of mill compounding and vulcanization are applicable. Stable hydroxy-terminated polymers are prepared by the reaction of linear polyesters [e.g., poly(ethyleneadipate)] or polyethers [e.g., poly(oxytetramethylene) glycol] with selected diisocyanates. Presently preferred are polyester based urethanes due to their resistance to high temperature failure.

Vulcanization of the foregoing polyurethanes may be effected by several different types of reagents, most commonly including, isocyanates, sulfur systems and peroxides. Suitable curing agents of the isocyanate types include, the dimer of tolylene-2,4-diisocyanate utilized at a curing temperature of about 150° C. causing the dissociation of the dimer into free isocyanates thereby effecting cure. Sulfur and peroxide cured polyurethane elastomers usually incorporate urea and amide groups as suitable crosslinking sites. The extent of crosslinking affects the properties in the resultant elastomer. Typical sulfur curing systems include sulfur, accelerators and an activator. The preferred accelerators for use herein are selected from, for example, mercapto-benzothiazoles and 2-mercaptobenzothiazyl disulfide.

The activators deemed suitable for use herein comprise, for instance, organo zinc oxide complexes, zinc chloride-benzothiazyl complexes (e.g., CAYTUR-4 ®), etc. The preferred peroxide curing agent is dicumyl peroxide, although other suitable peroxides may be utilized.

As millable polyurethane elastomers preferred herein for the construction of doffers having the desired properties, there may be mentioned Urepan-600, Adiprene C, Genthane S and Millathane 76 (Technical Sales Engineering, St. Petersburg, Fla.). The millable polyurethanes of the invention are linear or slightly branched chain polymers having a molecular weight between about 10,000 to 50,000 and a Mooney viscosity of about 20 to 65. Suitable polyurethane base formulations for the preparation of finished shaped doffers as depicted in FIG. 1 are set forth below:

EXAMPLE 1

Sulfur Cured

| | |
|---|---|
| Polyurethane (millathane 76 ®) | 100 |
| Hi-Sil 243 (hydrated amorphous silica)[1] | 35 |
| MBTS[2] | 4 |
| MBT[3] | 2 |
| Thanecure[4] | 1 |
| Sulfur | 1.5 |
| AC Poly 617 ®[5] | 2 |
| Cadmium Stearate | 0.5 |
| Batch Weight | 146[6] |
| Cure Doffer Pads | 45 min, 290° F.; 15 min, 310° F. |

[1]Cabot Corporation
[2]2-mercaptobenzothiazyl disulfide (accelerator)
[3]mercapto benzothiazole (accelerator)
[4]ZnCl$_2$ + MBTS (activator) (Technical Sales Engineering)
[5]Allied Chemical, polyethylene lubricant
[6]parts per hundred weight of raw polymer (PHR)

EXAMPLE 2

Peroxide Cured

| | |
|---|---|
| Polyurethane (millathane 76 ®) | 100 |
| Hi-Sil 243 | 30 |
| Stearic Acid | 0.5 |
| Di cup 40C[1] | 2 |
| Batch Weight | 132.5 |
| Cure Duffer Pads | 20 min, 310° F., 10 min, 320° F. |

[1]dicumyl peroxide, Hercules.

EXAMPLE 3

(Sulfur Cured)

| | |
|---|---|
| Polyurethane (millathane 76 ®) | 100 |
| Carbon Black[1] | 32 |
| MBTS | 4 |
| MBT | 2 |
| Thanecure | 1 |
| Sulfur | 1.5 |
| Cadmium Stearate | 0.5 |
| Batch Weight | 141 |
| Cure Doffer Pads | 45 min, 290° F. |

[1]N220, Phillips Petroleum

It will be appreciated that the polyester urethanes are subject to hydrolytic degradation and thus, where appropriate, the above formulations may contain, for example, a polycarbodiimide (1–4 phr) as a stabilizer.

As will be appreciated by those skilled in the art, the temperature and duration of curing, as well as the type of curing agent employed, affects the mechanical properties observed in the resultant cured polyurethane elastomers. It has been found with respect to sulfur cured systems that compression molding temperatures of 310° F. for 15 minutes or at 290° F. for 30 minutes result in ideally suitable doffer lugs having the desired properties of being resiliently deflectable as well as sufficiently tough to withstand the repeated abrasion, shock and temperature stresses thereon. Suitable curing conditions when utilizing a peroxide curing agent have been found to be within the range of about 295° F. to 335° F. for about 1.5 to 30 minutes.

The physical-mechanical properties characterizing the millable polyurethane elastomers utilized in accordance with the practices of the present invention as well as certain of the comparative properties for previously suggested castable polyurethanes are set forth below in Table I:

molding compositions, following vulcanization, are machinable. Accordingly, the molded doffers may be tool cut, shaped or otherwise worked to obtain completely uniform lug alignment thereby permitting narrow spindle/doffer tolerances. Castable polyurethanes, of course, lack the abrasion and high temperature resistance of the millable polyurethanes and, thus, are not readily machinable.

It will also be appreciated by reference to FIG. 1 that the doffer lug portions 14 can be integrally heat bonded to the center doffer disc 12 according to conventional assembly methods. Alternatively, of course, the outer doffer lug portion can be prepared separately in suitable curing presses having the desired configuration and optionally provided with an inner annular portion of sufficient dimensions to overlappingly engage the center doffer disc 12 to accomplish joining same by conventional fastening means such as rivets, pins, bolts,

TABLE I

| Physical Properties | Polyol/isocyanate Castable Polyurethane[1] | Example 1 | Example 2 | Example 3 |
|---|---|---|---|---|
| Specific Gravity | 1.27 | 1.37 | 1.37 | 1.36 |
| Volume Change, Percent 48 hrs./158° F./JDN 305 Spindle Grease | 2.1 | 3.7 | 3.0 | 4.4 |
| Tear Strenqth (ASTM-D624C, Die C, Ambient, PI (%) | 375 | 335 | 185 | 240 |
| At 212° F., PI | 215(57) | 275(81) | 75(40) | 230(95) |
| At 300° F., PI | 95(25) | 170(51) | 45(24) | 125(52) |
| Tested at Ambient: | | | | |
| Tensile, PSI | 7115 | 3930 | 3540 | 4475 |
| Modulus at 100 E, PSI | 575 | 310 | 345 | 655 |
| Modulus at 200 E, PSI | 705 | 640 | 715 | 1630 |
| Modulus at 300 E, PSI | 905 | 1110 | 1340 | 2750 |
| Ultimate E | 700 | 605 | 475 | 495 |
| Hardness, Shore A | 80 | 72 | 73 | 76 |
| Tested at 212° F.: | | | | |
| Tensile, PSI (%) | No rupture* | 1730(44) | 730(21) | 2035(45) |
| Modulus at 100 E, PSI | 320(56) | 175(56) | 215(63) | 405(62) |
| Modulus at 200 E, PSI | 375(53) | 410(64) | 490(69) | 1050(64) |
| Modulus at 300 E, PSI | 425(47) | 605(54) | ** | 1475(54) |
| Modulus at 900 E, PSI | 2665 | ** | ** | ** |
| Ultimate E, | Softens* | 650(107) | 290(61) | 415(83) |
| Tested at 300° F.: | | | | |
| Tensile, PSI (%) | No rupture* | 650(17) | 445(13) | 1155(25) |
| Modulus at 100 E, PSI | 140(24) | 140(46) | 205(59) | 285(44) |
| Modulus at 200 E, PSI | 155(22) | 365(57) | ** | 760(47) |
| Modulus at 300 E, PSI | 175(19) | 515(47) | ** | 1105(40) |
| Modulus at 900 E, PSI | 490 | * | * | * |
| Ultimate E, | Softens* | 410(68) | 150(32) | 305(61) |
| Elongation Set (%) | 30%-212° F. | 10%-212° F. | 10%-212° F. | |
| | 80%-300° F. | 15%-300° F. | 15%-300° F. | |
| Crack Growth, Demattia Test Cycles (32nds of an inch) (ASTM D430-B) | | | | |
| After 800 cycles | Failed | 4 | 16 | — |
| 2,000 | | 6 | 29 | — |
| 5,000 | | 12 | failed | 25 |
| 10,000 | | 16 | " | 29 |
| 15,000 | | 19 | " | Failed |
| 20,000 | | 22 | " | |
| 25,000 | | 23 | " | |
| 30,000 | | 25 | failed | |
| 35,000 | | 30 | | |

[1]Polymeric Technology, Inc., Oakland, CA.
*Tensile failure beyond limits of test machine
**not measurable It will be appreciated from the foregoing that castable polyurethanes do not possess mechanical properties which are in anyway favorably comparable to those of the millable polyurethane elastomers utilized in the improved doffers of the present invention.

It should be especially noted that one of the advantages of the present invention is that the polyurethane screws, etc. Likewise, in an alternative embodiment, the entire doffer assembly can be formed as an integral unit by conventional injection molding and curing methods. For example, such injection molding techniques may be carried out by placing the disc plate mold in the preconfigured mold apparatus and injecting the polyurethane molding composition in the closed mold. It should be noted that to ensure proper bonding between the disc plate and the doffer lugs, the disc plate material should be thoroughly degreased, sand blasted and cleaned before applying bonding adhesives and carrying out the molding operation.

While the invention has been described and illustrated with reference to certain preferred embodiments thereof, those skilled in the art will appreciate that various changes, modifications, and substitutions can be made therein without departing from the spirit of the invention. It is intended, therefore, that the invention be limited only by the scope of the claims which follow.

What is claimed is:

1. A doffer unit for cotton picking machines comprising a hub portion adapted to drivingly engage a driveshaft, a ring portion concentric with said hub portion and a plurality of circumferentially spaced, radially extending lugs carried by said ring and disposed on one planar side of said unit and wherein said doffer lugs are comprised of a vulcanized millable polyurethane elastomer.

2. The doffer unit of claim 1 wherein said millable polyurethane elastomer is sulfur cured.

3. The doffer unit of claim 1 wherein said millable polyurethane elastomer is peroxide cured.

4. The doffer unit of claim 1 wherein the polyurethane in said millable polyurethane elastomer is a polyether or polyester based polyurethane.

5. The doffer unit of claim 1 wherein said polyurethane is a polyester type.

6. The doffer unit of claim 1 wherein said vulcanized polyurethane elastomer has a tensile strength of between about 3800 to 4200 psi., a modulus at 300% extension of 900 to 1800 psi, an elongation at break of about 350 to 650, a Shore A hardness of 60–75 and a DeMattia flexure of less than about 30/32 inch after 35,000 cycles.

7. The doffer unit of claim 1 wherein said doffer lugs are formed by injection molding of said millable polyurethane elastomer.

8. The doffer unit of claim 1 wherein said millable polyurethane elastomer is compression molded at a temperature ranging from about 280° F. to about 310° F. for about 15 to 30 minutes.

9. The doffer unit of claim 1 wherein said millable polyurethane elastomer is derived from a formulation comprised of a polyester-urethane having a number average molecular weight of between about 10,000 to 50,000 in combination with a sulfur or peroxide curing agent, accelerator, activator, lubricant and a filler.

10. A cotton picking unit having a plurality of doffers and arranged to doff cotton and associated matter from a plurality of cooperating spindles, said doffers comprising a doffer unit for cotton picking machines comprising a hub portion adapted to drivingly engage a drive shaft, a ring portion concentric with said hub portion and a plurality of circumferentially spaced, radially extending lugs carried by said ring and disposed on one planar side of said unit and wherein said doffer lugs are comprised of a vulcanized millable polyurethane elastomer.

* * * * *